April 7, 1953 F. R. CHESTER 2,633,814
ICE-CREAM SCOOP
Filed May 26, 1950
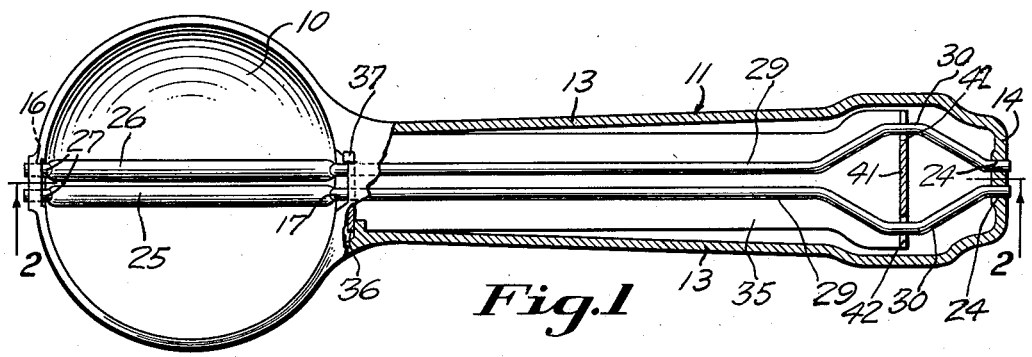
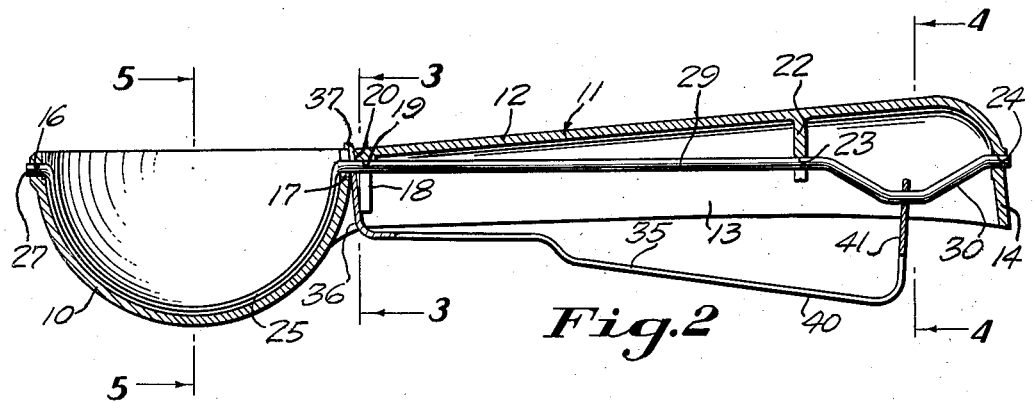
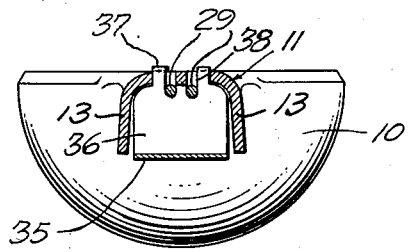
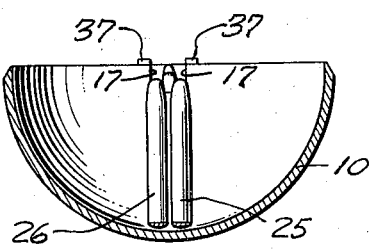
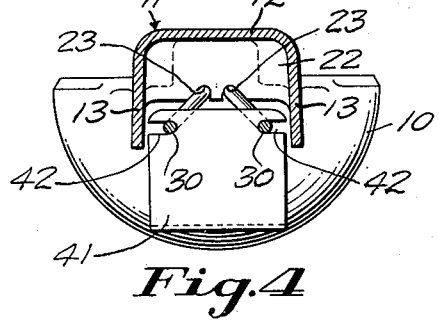
INVENTOR.
FRANK R. CHESTER
BY
Walter J. Stevenson
AGENT Patented Apr. 7, 1953

2,633,814

UNITED STATES PATENT OFFICE 2,633,814

ICE-CREAM SCOOP

Frank R. Chester, Santa Monica, Calif.

Application May 26, 1950, Serial No. 164,512

6 Claims. (Cl. 107—48)

This invention relates to dispensing devices, and particularly to a scoop adapted for use in dispensing viscid material, such as ice-cream and other semi-liquid foods.

Various forms of dispensing devices of the scoop type are employed for dispensing ice-cream and, as well known, these are subject to several disadvantages. In the first place, ice-cream which is frozen at a low temperature possesses the inherent ability to freeze quickly against a metal surface with which it makes contact, and for this reason a common metal scoop is unsuitable for the purpose. For this reason, scoops having a curved cutter or separator element rotatable or oscillatable therein have been proposed. Such scoops are quite efficient in use, and the possibility of the ice-cream freezing against the interior of the scoop to impair dispensing of the ice-cream is avoided. However, such dispensers of the scoop type having an oscillatable cutter element have complicated operating means for the cutter element, and this adds greatly to the manufacturing cost of the article. Various scoops have been designed with a view toward producing a dispenser which would be inexpensive to manufacture, and while many of these have been in use it has been found that they are inefficient in operation, the main reason being that their cutting elements or blades do not completely free or separate the ice-cream from the scoop. This deficiency has been due to the fact that the cutting element or blade moves through an arc from one side of the scoop or dipper to the opposite side thereof, and thus the ice-cream, which freezes rapidly against a metallic surface, refreezes tenaciously against the first side as it is being cut from the opposite side. In other words, the ice-cream freezes quickly and firmly against the interior of the scoop at the side opposite to the side which is at this time engaged by the knife so that very rapid and repeated oscillations of the knife are necessary in order to completely separate the mass or serving of ice-cream to permit discharge of the same from the scoop. The operation of dispensing a scoop of ice-cream is thus time-consuming, and this is an important consideration in establishments where scoops of ice-cream are dispensed in quantity.

It is therefore an important object of this invention to obviate the deficiencies of previous dispensers of the scoop or dipper type by providing a scoop device having a pair of semi-circular cutters or knives, these knives being simultaneously oscillated in opposite directions and each movable from a position at the bottom of the scoop or bowl to a position adjacent the rim of the scoop at the side thereof. By this means, the ice-cream is completely freed from the bottom of the bowl and simultaneously from the sides of the bowl as the two knives move upwardly and outwardly. It has been determined that due to this rapid, dual cutting action a more efficient cutting of the mass of ice-cream is achieved, and a single manipulation of the cutting means accomplishes the desired result in less time than was formerly required.

Another object of the invention is to provide a serving device which is inexpensive to manufacture, the parts being adapted to be produced by economical mass production methods and assembled without the use of screws, rivets, or other extraneous elements.

A further object is to provide a device of the type indicated which is light in weight, durable in use, and one which is more easily operated than other devices heretofore employed.

A still further object is to provide a scoop device of the class specified in which the operating means consists of a flexible element which actuates a pair of cranks formed integral with the cutter elements, a simple flexing of the operating means effecting positive operation of the cutter elements.

Further objects will appear from the following description and from the drawing, which is intended for the purpose of illustration only, and in which:

Fig. 1 is a plan view of the dispensing device, the handle of the device being broken away to illustrate the operating means disposed therein;

Fig. 2 is a longitudinal sectional view, taken on line 2—2 of Fig. 1;

Fig. 3 is a cross-sectional view, taken on line 3—3 of Fig. 2;

Fig. 4 is a cross-sectional view, taken on line 4—4 of Fig. 2; and,

Fig. 5 is a cross-sectional view, taken on line 5—5 of Fig. 2.

Referring to the drawing in detail, the present improved dispensing or serving device includes a bowl-like scoop or dipper 10 which is of hemispherical contour. Formed integral with the scoop 10 is a handle 11 which, as shown in Fig. 4, is of inverted channel-shape in cross-section, the handle having a top wall 12, side walls 13, and an end wall 14. The end of the scoop 10 which is disposed remotely from the handle 11 is provided with a pair of transversely spaced apertures 16 in its upper rim portion. At its opposite side, the rim of the scoop has a pair of transversely spaced vertical slots 17. Rearwardly of the slots 17, the handle 11 has a depending lug 18 formed with a pair of transversely spaced, vertical slots 19. Between that portion of the top wall 12 from which the lug 18 projects, a vertical slit 20 is provided, this slit communicating with the slots 17. The handle 11 has a second lug 22 which projects downwardly from the top wall 12, this lug also having a pair of transversely spaced vertical slots 23. The rear end wall 14 of the handle 11 has similarly spaced apertures 24.

The various apertures and slots referred to above provide longitudinally spaced bearings for a pair of cutter or knife elements which have semi-circular cutters or knives 25 and 26 at their forward ends. The cutters 25 and 26 are relatively flat in cross-section, as shown in Fig. 5, and have circular pintles 27 at their forward ends which are rotatable in the apertures 16. The rearward portions of the knives 25 and 26 are connected to rearwardly extending crank rods 29, the forward ends of which are rotatable in the slots 17 and 19. The rearward ends of the crank rods 29 are rotatable in the apertures 24. At a point intermediate the ends of the handle 11, the crank rods 29 rotate in the slots 23. It is to be noted that the apertures 16 and 24 and the bottoms of the slots 17, 19, and 23, substantially align. Between the lug 22 and the end wall 14, the crank rods 29 have offset crank portions 30. The crank rods 29 are preferably made from wire stock bent to the shape disclosed in Fig. 2.

A flexible operating member 35, made from spring metal, is employed for simultaneously rotating or oscillating the knife elements. The operating member 35 is of substantially U-shape in side view (Fig. 2) and has a forward, upwardly extending end portion 36 which has forwardly bent ears 37 at its upper extremity. The end portion 36 is disposed in the slit 20 with its ears overlying the rearward portion of the rim of the scoop or dipper 10, this end portion having vertical slots 38 through which the crank rods 29 extend. The operating member 35 slopes downwardly and rearwardly below the lower edges of the side walls 13 to provide a finger-grip portion 40. The rearward end of the member 35 is bent upwardly to provide plate-like portion 41 (Figs. 1, 2, and 4), this portion having horizontal slots 42 extending inwardly from its vertical edges and through which the cranks 30 extend.

To assemble the device, the rearward ends of the crank rods 29 are slid rearwardly through the slots 17, 19, and 23, and their rearward ends are inserted through the apertures 24. This insertion of the crank rods 29 causes the semi-circular cutters 25 and 26 to be disposed within the scope 10. The cutters 25 and 26 are then sprung rearwardly and their pintles 27 are snapped into the apertures 16. The cutter elements are thus mounted for oscillation about their axes. The operating member 35 is next applied to the handle 11 by inserting its forward end portion 36 in the slit 20, and by pressing this portion upwardly its ears 37 are caused to snap over the rearward rim portion of the scoop, as shown in Fig. 2. After the forward end of the operating member 35 has thus been connected to the handle 11, the rearward end of the operating member is forced upwardly, the member flexing to permit this action. It is to be noted that the lug 18 serves as an abutment across which the operating member is flexed. With the rearward end 41 of the operating member 35 in upper position, the cranks 30 are sprung into the slots 42 to complete the assembly of the device. The inherent resiliency of the operating member 35 tends to flex its rearward end downwardly and thus cause the cranks 30 to move downwardly and toward each other. However, this movement of the cranks 30 is limited by the engagement of the knives or cutters 25 and 26 which are adapted to meet at the longitudinal plane of the device. At this time the cranks 30 are inclined at angles of approximately 45 degrees with respect to the horizontal.

The scoop or serving device is operated as next explained. When it is desired to serve a portion of food, for example ice-cream, the handle 11 is grasped in the hand of the operator who scoops the ice-cream from the container to fill the bowl or scoop 10. The device is then at least partially inverted to dispose the open upper end of the dipper 10 over the dish, glass, edible cone, or other receptacle, into which the ice-cream is to be placed. The operator then flexes the operating member 35 toward the handle 11, and this is readily accomplished by the last three or four digits of the hand in which the handle is held.

As the operating member 35 is thus flexed, the rearward end 41, acting through its horizontal slots 42, simultaneously pivots both crank rods 29 upwardly in opposite directions. Consequently, the semi-circular cutters or knives 10 are simultaneously pivoted from the position shown in full lines to the position indicated by broken lines in Fig. 5. This action is rapid, and since the ice-cream is quickly freed from both sides of the bowl 10 at the same time, the mass of ice-cream is completely separated from the entire internal surface of the scoop and the refreezing of the ice-cream against the scoop is avoided. The ice-cream is thus ordinarily removed from the scoop or dipper by a single actuation of the operating member. However, if for any reason the frozen dessert should still adhere to the scoop 10, flexing of the operating member may be continued until the ice-cream becomes completely dislodged from the scoop, repeated operations of the device causing each knife or cutter 25 and 26 to oscillate rapidly through an arc of approximately 90 degrees. Engagement of the upper edge of the plate-like end 41 of the operating member against the top wall 12 of the handle 11 will, of course, limit the upward movement of the cutters 25 and 26.

It has been found that the present dispensing device may be used to advantage in serving foods other than frozen desserts. For example, the device is also particularly adapted for use in serving warm viscid foods, such as mashed potatoes and other vegetables, the oscillatable cutters 25 and 26 being highly effective in freeing the hot food which tends to adhere to the interior of the scoop. The combined scoop and handle may be made from metal as a die-casting, or may be readily molded from a thermo-setting plastic material. Preferably the knife members are made from a stainless metal.

While the dispensing device has been herein disclosed as embodied in a preferred construction, it will be apparent to one skilled in the art that various modifications might be made in the construction without departing from the spirit of the invention.

I claim as my invention:

1. A scoop-type dispensing device, comprising: a bowl-like scoop of hemi-spherical contour having a rim and a handle projecting laterally from the rim substantially in the plane thereof; a pair of semi-circular cutter elements oscillatably mounted in said scoop independently of each other, each element being pivotally movable from a first position in which it is disposed in a plane substantially normal to the plane of said rim, centrally of the scoop, to a second position adjacent said rim and substantially parallel to the plane thereof; a pair of crank rods, each operatively connected to a said cutter element and extending lengthwise within said handle, each crank rod being pivotally mounted in longitudinally spaced bearings and having an offset crank portion at its end which is disposed remotely from said scoop, said crank portions being disposed at opposite sides of the longitudinal plane of the scoop and handle and normal to the plane of said rim; and an oscillatory member having a first end affixed to the handle at the intersection of the rim and handle, and a second, free end having slotted plate means engaging said crank portions, oscillatory movement of said free end of said operating member in a plane normal to said longitudinal plane effecting pivotal movement of both rods so as to pivot said cutter elements simultaneously in opposite directions within said scoop.

2. A device as defined in claim 1, in which said operating member is flexible and adapted to be manually flexed in one direction to cause its said free end to move toward said handle so as to effect said pivotal movement of said cutter elements from said first position to said second position, the inherent resiliency of said operating member causing said operating member to flex in the opposite direction so as to return said cutter elements to said first position.

3. A device as defined in claim 1, in which said operating member is flexible and adapted to be manually flexed in one direction to cause its said free end to move toward said handle so as to effect said pivotal movement of said cutter elements from said first position to said second position, the inherent resiliency of said operating member causing the same to flex in the opposite direction so as to return said cutter elements to said first position, the first end of said operating member having an angular portion disposed in a slit in said handle at said intersection, said angular portion having at least one ear projecting through said slit and engaging said handle and retaining said first end of said operating member connected to said handle.

4. A device as defined in claim 1, in which said operating member is flexible and adapted to be manually flexed in one direction to cause its said free end to move toward said handle so as to effect said pivotal movement of said cutter elements from said first position to said second position, the inherent resiliency of said operating member causing said operating member to flex in the opposite direction so as to return said cutter elements to said first position, said operating member having an angularly extending end portion disposed in a slit in said handle, said end portion having at least one ear projecting through said slit and overlying an exterior surface of said handle and retaining said first end of said operating member connected to said handle, the plate means of said operating member having transversely spaced slots in which said crank portions are disposed.

5. A device as defined in claim 1, in which said operating member is flexible and adapted to be flexed in one direction to cause its said free end to move toward said handle so as to effect said pivotal movement of said cutter elements from said first position to said second position, the inherent resiliency of said operating member causing the same to flex in the opposite direction so as to return said cutter elements to said first position, said operating member having an angular portion at its first end disposed in a slit in said handle, said angular portion having at least one ear projecting through said slit and overlying an exterior surface of said handle and retaining said operating member connected to said handle, said plate means of said operating member comprising an angular plate-like portion provided with transversely spaced slots, aligned in a plane parallel to the plane of said rim, in which said crank portions are disposed.

6. A scoop-like dispensing device, comprising: a bowl-like scoop of hemi-spherical contour and having a rim and a laterally extending handle of channel shaped cross-section having a longitudinal wall, opposite parallel side walls and an end wall disposed remotely from the scoop, said handle having a transverse slit in its longitudinal wall adjacent said rim; a pair of semi-circular cutter elements oscillatably mounted in said scoop, each element being movable from a first position in which it is disposed in a plane substantially normal to the plane of said rim, centrally of said scoop, to a second position adjacent said rim and substantially parallel to the plane thereof, each cutter element having a crank rod extending longitudinally in said handle, said rods being spaced transversely and pivotally mounted in longitudinally spaced bearings in said scoop and said handle, said rods having offset crank portions at their ends disposed adjacent said end wall; and a flexible operating member extending longitudinally along said handle and having an angularly projecting portion at one end extending through said slit, said projecting portion having at least one resilient ear adapted to snap over an edge of said slit so as to retain said portion connected to said handle, said operating member having an angularly projecting plate portion disposed within said handle, adjacent said end wall thereof, and having a slot in each of its side edges extending parallel to the plane of said rim, said crank portions being disposed in said slots, said slots being disposed at opposite sides of the longitudinal plane of said handle extending normal to the plane of said rim, flexing of said operating member in said longitudinal plane effecting oscillation of said crank portions so as to impart like oscillation to said cutter elements in said scoop.

FRANK R. CHESTER.

REFERENCES CITED

The following references are of record in the file of this patent:

UNITED STATES PATENTS

| Number | Name | Date |
|---|---|---|
| 900,573 | McCarren | Oct. 6, 1908 |
| 1,109,576 | Gilchrist | Sept. 1, 1914 |
| 1,956,224 | Myers | Apr. 24, 1934 |

FOREIGN PATENTS

| Number | Country | Date |
|---|---|---|
| 6,671 | Great Britain | July 23, 1908 |